June 18, 1935.   H. A. DOUGLAS   2,005,078
AEROPLANE
Original Filed March 5, 1930   2 Sheets-Sheet 1

Inventor:
Harry A. Douglas

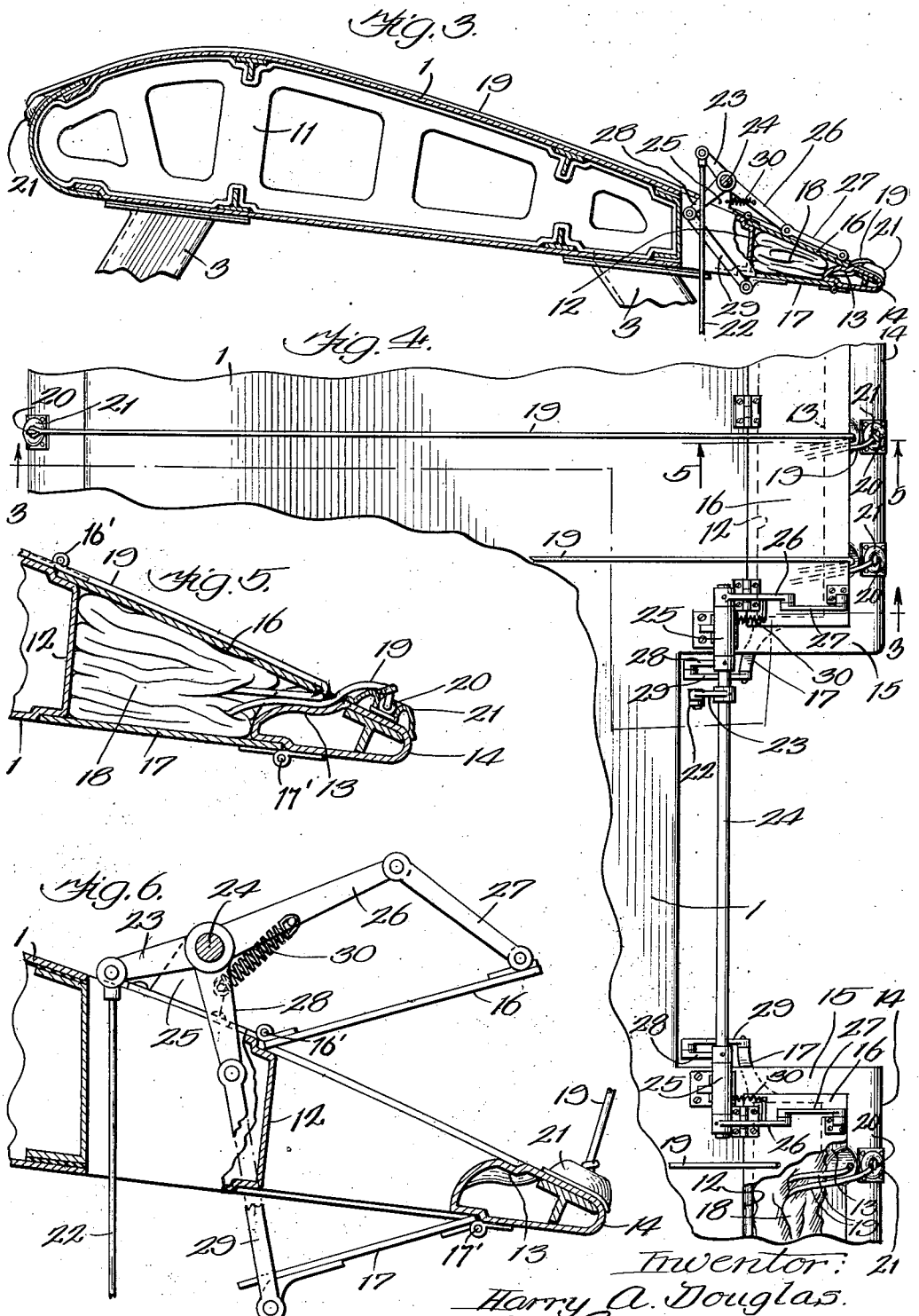

Patented June 18, 1935

2,005,078

UNITED STATES PATENT OFFICE 2,005,078

AEROPLANE

Harry A. Douglas, Bronson, Mich.

Application March 5, 1930, Serial No. 433,308
Renewed December 2, 1931

3 Claims. (Cl. 244—21)

My invention relates to aeroplanes and has for its object the combination of parachutes therewith that serve to retard their descent to a safe speed in the event of incapacitation of the power plants thereof.

My invention, generally speaking, resides in the provision of a container or containers for the parachutes which are so positioned and constructed that air may be directed thereinto to dislodge the parachutes therefrom and initiate their inflation. Suitable means are provided for normally holding the parachutes in their containers. The means employed are preferably closures for the containers which hold the parachutes in place and normally prevent the flow of air to the parachutes. In accordance with the preferred embodiment of the invention the aeroplane is equipped with one and preferably two parachutes, each parachute being enclosed within a container which has opposite sides thereof in the form of lids or closures that enable the parachutes to be readily stored within the containers and which, when open, furnish passage for air through the containers and into the parachutes, whereby the parachutes are dislodged and sufficiently initially inflated to permit their inflation to proceed to completion as the aeroplane descends. The containers are thus normally closed wind chutes constructed and directed to effect the desired control of the parachutes. The containers are preferably component parts of an aeroplane wing. The closures of the containers normally desirably constitute portions of the upper and lower wing surfaces. The lower closure of each container is preferably hinged at its rear or trailing edge and the upper closure at its forward or leading edge and lever mechanism is provided for simultaneously opening these closures and disposing the same obliquely with respect to the axis of the aeroplane that is usually also the axis of the fuselage and propeller.

Figure 1:
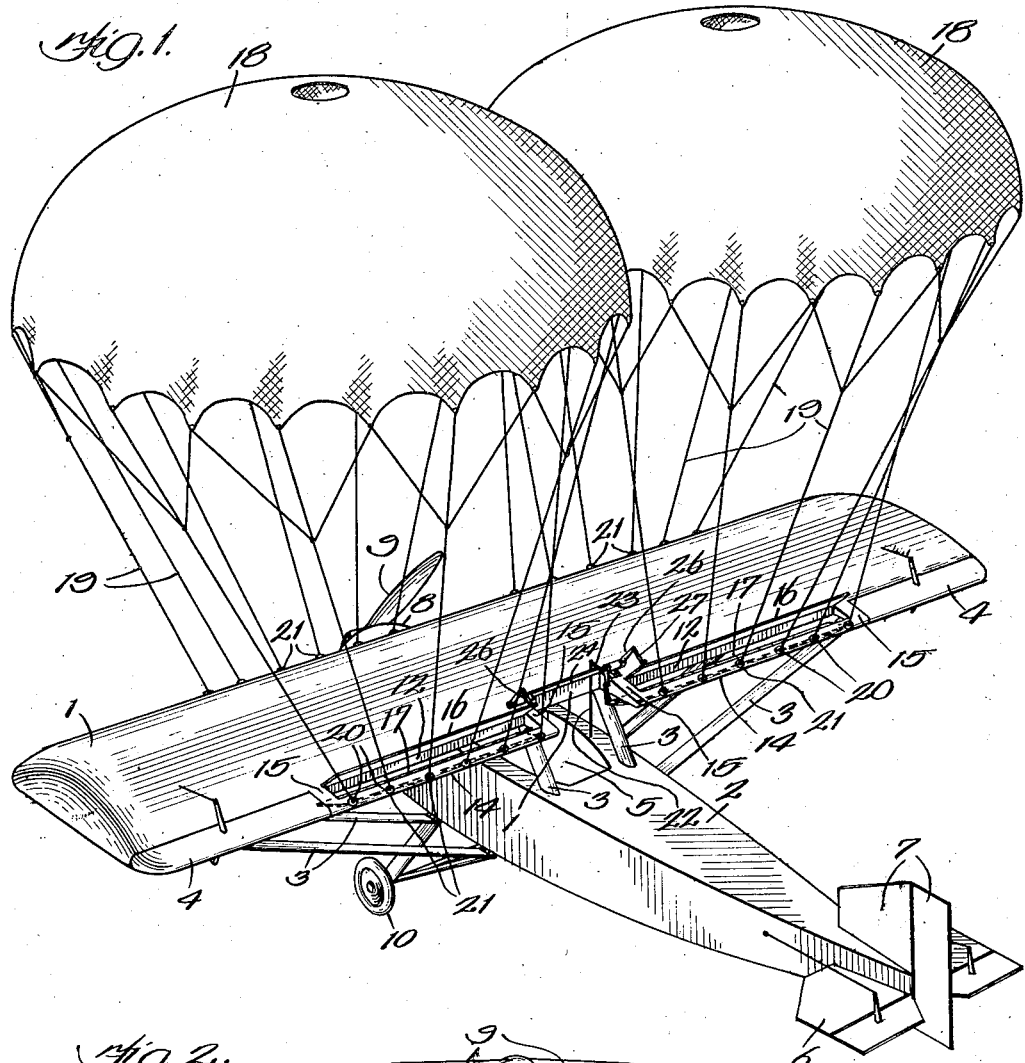
Figure 2:
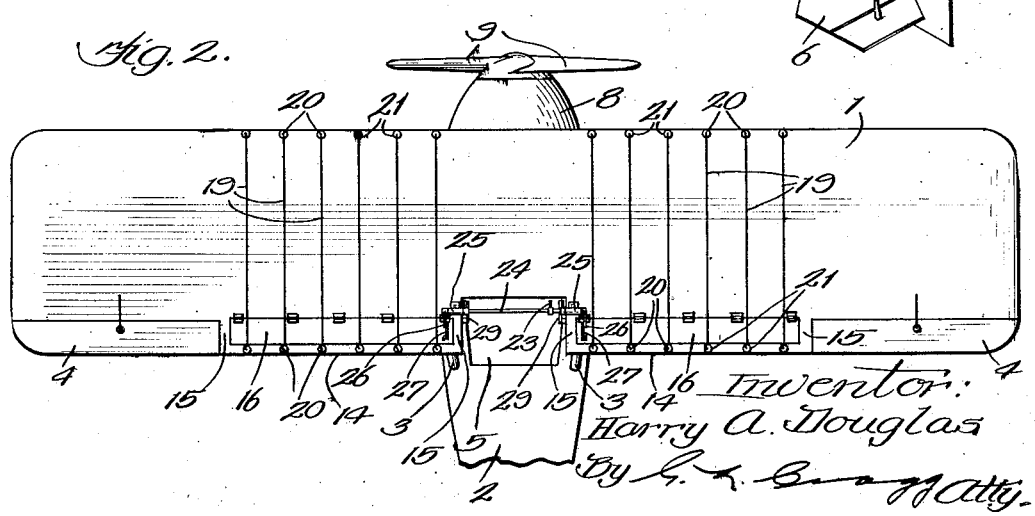

The invention will be more fully explained in connection with the accompanying drawings in which Fig. 1 is a perspective view illustrating the preferred embodiment of the invention with the parachutes in inflated adjustment to retard the descent of the aeroplane to a safe speed; Fig. 2 is a plan view of the aeroplane shown in Fig. 1 but with the parachutes boxed within their containers, a rear portion of the fuselage being broken away; Fig. 3 is a cross sectional view of one of the wings taken in the region of one of the parachute containers, this figure being taken on line 3—3 of Fig. 4; Fig. 4 is a plan view, on a larger scale, of a part of the structure appearing in Fig. 2; Fig. 5 is a sectional view on line 5—5 of Fig. 4; and Fig. 6 is a view similar to Fig. 5, but with the closures of the parachute container illustrated in open adjustment, it being understood that the parachute is dislodged into supporting relation with the aeroplane.

The aeroplane to which my invention is adaptable may be of any suitable or preferred construction. I have illustrated a monoplane which is inclusive of a single wing 1 and a fuselage 2 which is assembled with the wing by suitable truss construction familiar to those skilled in the art and generally illustrated at 3. The wing 1 is equipped with the usual ailerons 4 which are controlled from the cockpit 5 by suitable lever mechanisms, not illustrated. The fuselage is equipped with the suitable or usual horizontal and vertical rudders 6 and 7 which are also governed from the cockpit. The internal combustion engine or motor is disposed within the nose 8 of the fuselage, as is well understood by those familiar with the art, this motor being in driving relation with the propeller blades 9. The axis of the fuselage and the axis of rotation of the propeller blades are substantially coincident. The usual landing gear 10 is provided beneath the fuselage.

The wing is preferably hollow, as indicated in Figs. 3, 4 and 6, there being suitable struts or supporting ribs 11 distributed along the wing and arranged transversely thereof to maintain the exterior surfaces of the wing in substantially fixed relation. The wing, which is thus made hollow, has added to it the aforesaid ailerons 4 and also two parachute containers which are disposed between the midportion of the wing and the ailerons. Each parachute container has its front wall 12 constituted of the back wall of the wing. The rear wall 13 of the container is sinuous in form and constitutes the front wall portion of the hollow frame member 14. These hollow frame members are joined with the body of the wing by the side members 15 which also provide the end walls of the parachute containers. The top walls 16 of the parachute containers constitute lids or closures and the opposite and bottom walls 17 of said containers also constitute closures. The upper closures 16 are hinged at their front or leading edges, while the rear edges of the container closures 17 are hinged to the frame portions 14. The parachutes 18 are normally stored in said containers in deflated adjustment as illustrated clearly in Figs. 3, 4 and 5. The closures 16 and 17 for said containers are, when closed, stream line continuations of the wing and supplement the wing in its functions.

When the aeroplane is in danger of descending too fast the closures for the parachute containers are opened. The lower closures 17 are then inclined downwardly and forwardly and the upper closures 16 are inclined rearwardly and upwardly with the result that each pair of closures and the balance of the corresponding container constitute a wind chute to direct air in forceful currents through the interiors of the containers and into the parachutes. When said closures are thus adjusted and under the assumption that the aeroplane is descending at a fair speed the parachutes will be lifted and initially inflated, the inflation of the parachutes being completed upon further descent of the aeroplane. The parachutes are attached to the wing by means of ropes 19. Some of these ropes are anchored to the front margin of the wing and the remainder in the region of the rear margin of the wing. Each rope is desirably passed through an eye 20 and is thereafter knotted to prevent its withdrawal. The eyelets are desirably received within sockets 21 that are carried upon frame portions 14 and the front of the wing. When the parachutes are housed within their containers the closures 16 and 17 are shut, leaving openings through which the ropes 19 pass into connection with the eyelets 20. The container closures 16 and 17 are desirably simultaneously operated from the cockpit. To this end I provide an operating rod 22 which is accessible at the cockpit. This rod has its upper end connected with an arm 23 which is fixed upon a transverse horizontal shaft 24. This shaft is journaled within bearings 25 that are carried upon the body of the wing. An arm 26 is fixed upon each end of the shaft. The outer end of each of these arms is connected with the corresponding parachute container closure 16 by a link 27, the lower end of each link being connected with the corresponding closure 16 at the rear or trailing edge of such closure. Other arms 28 are fixed upon the shaft 24, these latter arms being between the bearings 25. Each parachute container closure 17 has an arm 28 individual thereto and connected therewith. Such connection is effected by means of links 29 which join the lower ends of the arms 28 with the forward or leading edges of these closures. When the closures are shut, the points of connection between the arms 26 and the links 27 are below lines which include the places of connection of the closure 16 and links 27 and the axis of the shaft 24, whereby the closures 16 are normally maintained shut. Springs 30 connect the bearings 25 with the arms 26 to insure this result. The lower closures 17 are, by this means, also maintained normally shut.

When the closures are shut they constitute, in the embodiment of the invention illustrated, substantially smooth continuations of the upper and lower wing surfaces and therefore may be said to constitute supplemental portions of the wing.

Changes may be made without departing from the invention.

Having thus described my invention, I claim:

1. In combination with an aeroplane; a parachute attached thereto for checking its descent; a plurality of air chute defining members pivotally mounted on said aeroplane for releasably confining said parachute in a deflated condition; linkage mechanism for shifting said chute defining members in unison to an acute angle to the planing surface of said aeroplane to cause air to discharge said parachute from said air chute in a rearward direction; said linkage mechanism embodying a toggle connection for preventing the accidental operation of said mechanism.

2. In combination with an aeroplane having a parachute attached thereto for checking its descent; a plurality of members pivotally mounted on the trailing edge of a wing of said aeroplane and defining a chute extending in the direction of flight of said aeroplane and adapted to releasably contain said parachute in a deflated condition; and linkage mechanism interconnecting said members for swinging said members in unison to an upwardly and rearwardly inclined position to establish communication between the forward end of said chute and the outer atmosphere beneath said wing, and between the rear end of said chute and the outer atmosphere above said wing, whereby air will be deflected through said chute in an upward and rearward direction to eject the parachute therefrom clear of said aeroplane horizontally.

3. In combination with an aeroplane having a parachute attached thereto for checking its descent; upper and lower members defining a compartment adapted to contain said parachute, said upper member being pivotally mounted adjacent to the forward edge thereof to the upper surface of said wing and adapted when closed to form a continuation of said upper surface, and said lower member being pivotally mounted adjacent to the rear edge thereof to the lower surface of said wing and adapted when closed to form a continuation of said lower surface; a lever pivotally mounted intermediate its ends on said wing; means for connecting one arm of said lever to said upper member; means for connecting the other arm of said lever to said lower member; means for rocking said lever to swing said upper member in an upward direction and said lower member in a downward direction to deflect air into said compartment to eject said parachute in an upward and rearward direction; and means for yieldably opposing the movement of said member.

HARRY A. DOUGLAS.